United States Patent [19]
Le Tron

[11] Patent Number: 6,073,084
[45] Date of Patent: Jun. 6, 2000

[54] PROCESS AND DEVICE FOR VERIFYING THE CONSISTENCY OF THE MEASUREMENTS FROM AN ANGLE-OF-ATTACK PROBE

[75] Inventor: Xavier Le Tron, Toulouse, France

[73] Assignee: Aerospatiale Societe Nationale Industrielle, Paris, France

[21] Appl. No.: 09/033,977

[22] Filed: Mar. 3, 1998

[30] Foreign Application Priority Data

Mar. 3, 1997 [FR] France ................................. 97 02482

[51] Int. Cl.[7] .................................................. G01M 1/12
[52] U.S. Cl. ............................... 702/94; 701/6; 244/177; 244/181
[58] Field of Search .................................. 702/94; 701/6, 701/4, 5, 10, 124; 244/181, 178, 1 R, 76 R, 177; 73/65.06

[56] References Cited

U.S. PATENT DOCUMENTS

| | | | |
|---|---|---|---|
| 4,027,839 | 6/1977 | Quinlivan | 701/220 |
| 4,235,104 | 11/1980 | Hoadley et al. | 73/180 |
| 4,390,950 | 6/1983 | Muller | 244/181 |
| 4,586,140 | 4/1986 | Millen | 701/10 |
| 4,590,475 | 5/1986 | Brown | 340/966 |
| 4,893,245 | 1/1990 | Zweifel | 244/181 |
| 4,949,269 | 8/1990 | Buisson et al. | 701/124 |
| 5,119,091 | 6/1992 | Zweifel | 340/968 |

FOREIGN PATENT DOCUMENTS

| | | |
|---|---|---|
| WO 92 20052A | 11/1992 | WIPO . |

*Primary Examiner*—Marc S. Hoff
*Assistant Examiner*—Hien Vo
*Attorney, Agent, or Firm*—Fisher, Christen & Sabol

[57] ABSTRACT

A process and a device for verifying the consistency of the measurements made by an angle-of-attack probe (2) mounted on an aircraft. The device (1) includes:

first system (3) for computing a first coefficient of lift of the aircraft from a measurement from the probe (2) and from data relating to the aircraft;

second system (5) for computing a second coefficient of lift from information about the aircraft;

system (6) for computing the difference between the first and second coefficients of lift and for deducting therefrom that the measurement is or is not consistent.

10 Claims, 1 Drawing Sheet

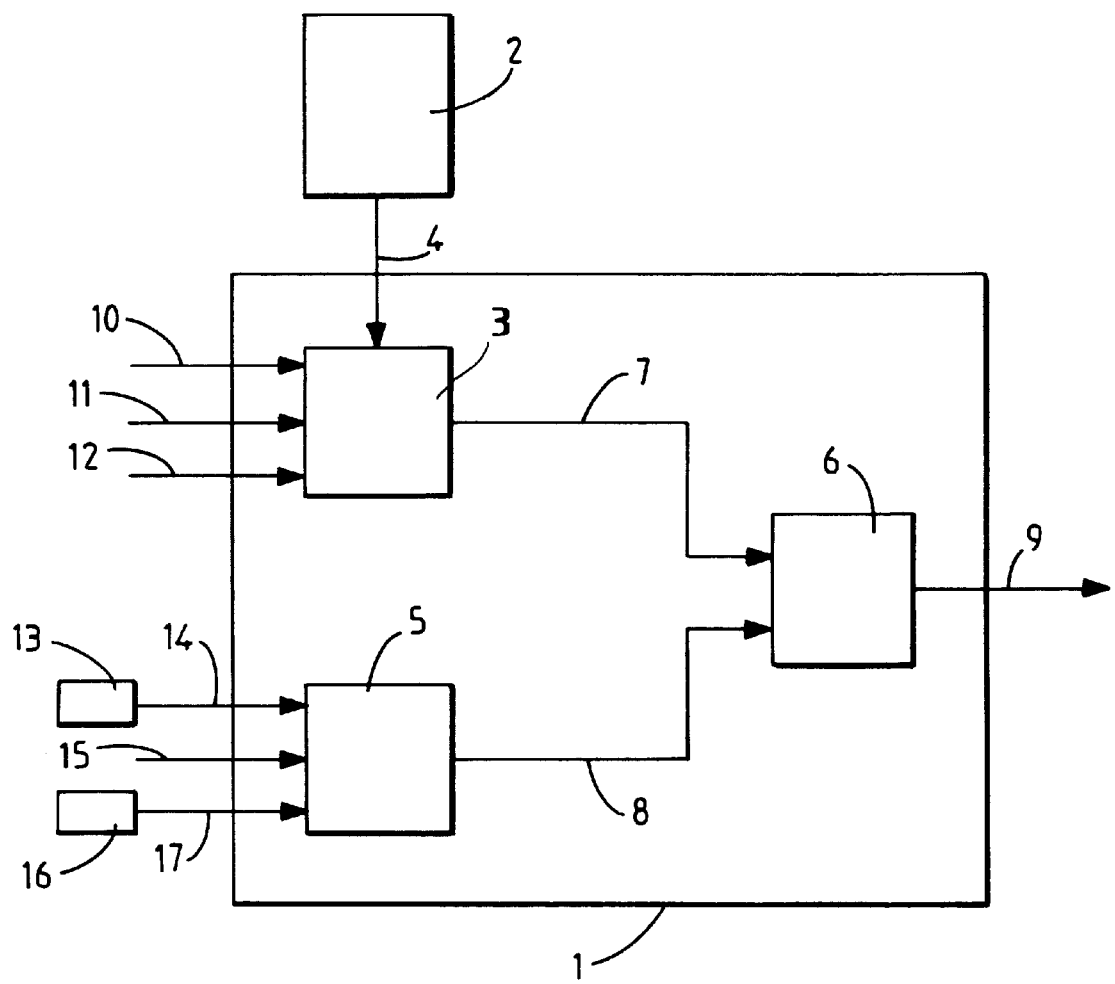

PROCESS AND DEVICE FOR VERIFYING THE CONSISTENCY OF THE MEASUREMENTS FROM AN ANGLE-OF-ATTACK PROBE

FIELD OF THE ART

The present invention relates to a process for verifying the consistency of the measurements made by at least one angle-of-attack probe mounted on an aircraft, as well as to a device for implementing said process.

BACKGROUND OF THE INVENTION

It is known that the measurements made by an angle-of-attack probe can be used by various systems with which said aircraft is equipped, and especially by said aircraft's electrical flight control.

Generally, an aircraft, for example a civil transport airplane, is fitted with a plurality of angle-of-attack probes. In this case, the measurements from one of said angle-of-attack probes are selected, for example with the aid of a polling means, with a view to their processing by user systems with which the aircraft is equipped.

By way of example, when the aircraft is fitted with three angle-of-attack probes simultaneously monitored by said polling means, the latter selects from among the three measurements made by the probes, the one exhibiting the median value.

Moreover, in this case, one of said angle-of-attack probes is declared to be faulty when the value which it delivers deviates by more than a predefined threshold factor from said median value.

This mode of detecting faults or inconsistency of the measurements from angle-of-attack probes is not entirely satisfactory, especially as regards its reliability. Indeed, if in the aforesaid case, two of the three angle-of-attack probes become faulty simultaneously, for example on account of the aircraft colliding with a flock of birds, they may transmit, on account of their unbalance, the same information. In this case, the aforesaid usual mode of detecting faults uses the information from these two faulty angle-of-attack probes as accurate and reliable and declares the third angle-of-attack probe, which continues to operate normally, to be faulty.

The object of the present invention is to overcome these drawbacks. It relates to a reliable process which is simple and rapid to implement and which makes it possible to verify the consistency of the measurements made by at least one angle-of-attack probe mounted on an aircraft.

To this end, according to the invention, said process is noteworthy in that:

- at least one measurement is made by means of said angle-of-attack probe;
- a first coefficient of lift of the aircraft is computed from said measurement and from data relating to the aircraft;
- a second coefficient of lift of the aircraft is computed from information available about said aircraft;
- the difference is computed between said first and second coefficients of lift of the aircraft; and
- from this is deduced:
  - if the difference thus computed is less than a predefined value, that the measurement made by the angle-of-attack probe is consistent; and
  - otherwise, that said measurement is inconsistent.

Thus, by virtue of the invention, an effective and reliable check of the consistency of the measurements of an angle-of-attack probe is obtained, which check is in particular independent of the measurements made by the other angle-of-attack probes of the aircraft and enables the aforesaid drawbacks to be overcome.

Advantageously, the data relating to the aircraft, which are used in computing the first coefficient of lift, represent aerodynamic data of the aircraft and data representative of its flight configuration.

Preferably, the position of the slats, of the flaps and of the airbrakes of the aircraft, together with the latter's Mach number are used as data representative of the flight configuration.

Furthermore, advantageously, said second coefficient of lift $Cz2$ is computed from the relation:

$$Cz2 = (nz.m.g)/(0.5.Pd.S)$$

in which:
- nz is the load factor of the aircraft;
- m is the mass of the aircraft;
- g is the acceleration due to gravity;
- Pd is the dynamic pressure; and
- S is a reference surface area of the aircraft.

Moreover, advantageously:
- the load factor nz is measured by an accelerometer of the aircraft; and/or
- the dynamic pressure Pd is measured by an anemometer of the aircraft.

Furthermore, in a first variant, the effective mass of the aircraft, which is measured, is used as mass m, whereas, in a second variant, the maximum mass of the aircraft is used as mass m.

The present invention applies more particularly to an aircraft fitted with a plurality of angle-of-attack probes and with a means of selection for selecting measurements from measurements made by said angle-of-attack probes. In this case, said means of selection can in particular be a polling means, such as mentioned above, or a computing element which for example averages the various measurements made by said angle-of-attack probes.

According to the invention, only the consistency of said selected measurements is thus verified.

The present invention also relates to a device for implementing the aforesaid process.

According to the invention, said device is noteworthy in that it comprises:

- a first computing means for computing said first coefficient of lift;
- a second computing means for computing said second coefficient of lift; and
- a central unit for verifying the consistency of the measurements of the angle-of-attack probe, on the basis of the computations made by said first and second computing means.

BRIEF DESCRIPTION OF THE DRAWINGS

The single FIGURE of the appended drawing will elucidate the manner in which the invention may be practiced. Represented in this FIGURE is the schematic diagram of a device in accordance with the invention.

DESCRIPTION OF THE PREFERRED EMBODIMENTS

The device 1 in accordance with the invention and represented diagrammatically in the FIGURE is intended to verify the consistency of the measurements made by at least one angle-of-attack probe 2 mounted on an aircraft (not represented).

To this end, said device 1 comprises, according to the invention:
- a computing means 3 connected by a link 4 to said angle-of-attack probe 2 and intended to compute a first coefficient of lift of the aircraft, as specified below;
- a computing means 5 intended to compute a second coefficient of lift of the aircraft, as likewise specified below; and
- a central unit 6 connected respectively by way of links 7 and 8 to said computing means 3 and 5, and capable of verifying the consistency of the measurements made by said angle-of-attack probe 2, from the computations carried out by said computing means 3 and 5, and of transmitting the result via a link 9 to a user device (not represented).

To compute said first coefficient of lift, the computing means 3 use, according to the invention, as data relating to the aircraft, on the one hand, aerodynamic data of the aircraft which are preferably stored in said computing means 3 and, on the other hand, data representative of the flight configuration of said aircraft.

More precisely, the computing means 3 receive, as data representative of the flight configuration, from known devices respectively, mounted on the aircraft and not represented:
- by way of a link 10, the position of the slats and flaps of the aircraft;
- by way of a link 11, the position of the airbrakes of the aircraft; and
- by way of a link 12, the Mach number of said aircraft.

Preferably, said first coefficient of lift is determined by means of known tables containing discrete values of coefficients of lift. In a known manner, there exists a plurality of different tables dependent on the aforesaid data representative of the flight configuration. Accordingly, the appropriate table is chosen and the first coefficient of lift is computed by interpolation from the values from said chosen table.

Additionally, the computing means 5 determine said second coefficient of lift Cz2 from the relation:

$$Cz2 = (nz.m.g)/(0.5.Pd.S)$$

in which:
- nz is the load factor of the aircraft, which is measured by an accelerometer 13 connected by a link 14 to the computing means 5;
- m is the mass of the aircraft, specified below and received via a link 15;
- g is the acceleration due to gravity;
- Pd is the dynamic pressure which is measured by an anemometer 16 connected by a link 17 to the computing means 5; and
- S is a reference surface area of the aircraft.

In a first embodiment, the computing means 5 use the effective mass of the aircraft, which is determined by an appropriate means (not represented), as mass m whereas, in a second embodiment, in particular when the effective mass of the aircraft is not available, said computing means 5 use the maximum mass of the aircraft as mass m.

Additionally, the central unit 6:
- computes the difference between said first and second coefficients of lift of the aircraft, which are received from said computing means 3 and 5 respectively; and deduces therefrom:
- if the difference thus computed is less than a predefined value, that the measurement made by the angle-of-attack probe is consistent;
- otherwise, that said measurement is inconsistent.

According to the invention, said predefined value is determined as a function of the characteristics of the aircraft. Generally, a value lying between 0.1 and 0.3 is used, these values being dimensionless when, rather than the vertical acceleration, the ratio between the latter and the acceleration due to gravity is used.

Of course, the present invention applies equally to an aircraft fitted with a plurality of angle-of-attack probes 2 and with a means of selection (not represented) for selecting measurements from said measurements made by the angle-of-attack probes. Said means of selection can be a polling means which chooses the measurements made by one of said angle-of-attack probes 2 or a computing element which averages the measurements made by all the angle-of-attack probes 2.

In this case, according to the invention, in a preferred embodiment, only the consistency of the measurements thus selected is verified by means of said device 1.

To this end, the link 4 is connected directly to the output of said means of selection.

What is claimed is:

1. A process for verifying the consistency of measurements made by at least one angle-of-attack probe (2) mounted on an aircraft, wherein:
   - at least one measurement is made by means of said angle-of-attack probe (2);
   - a first coefficient of lift of the aircraft is computed from said measurement and from data relating to the aircraft;
   - a second coefficient of lift of the aircraft is computed from information available about said aircraft;
   - the difference is computed between said first and second coefficients of lift of the aircraft; and from this is deduced:
   - if the difference thus computed is less than a predefined value, that the measurement made by the angle-of-attack probe is consistent; and
   - otherwise, that said measurement is inconsistent.

2. The process as claimed in claim 1, wherein the data relating to the aircraft, which are used in computing said first coefficient of lift, represent aerodynamic data of the aircraft and data representative of its flight configuration.

3. The process as claimed in claim 2, wherein the position of the slats, of the flaps and of the airbrakes of the aircraft, together with the latter's Mach number are used as data representative of the flight configuration.

4. The process as claimed in claim 1, wherein said second coefficient of lift Cz2 is computed from the relation:

$$Cz2 = (nz.m.g)/(0.5.Pd.S)$$

in which:
- is the load factor of the aircraft;
- m is the mass of the aircraft;
- g is the acceleration due to gravity;
- Pd is the dynamic pressure; and
- S is a reference surface area of the aircraft.

5. The process as claimed in claim 4, wherein said load factor nz is measured by an accelerometer (13) of the aircraft.

6. The process as claimed in claim 4, wherein said dynamic pressure Pd is measured by an anemometer (16) of the aircraft.

7. The process as claimed in claim 4, wherein the effective mass of the aircraft, which is measured, is used as mass m.

8. The process as claimed in claim 4, wherein the maximum mass of the aircraft is used as mass m.

9. The process as claimed in claim 1, for an aircraft fitted with a plurality of angle-of-attack probes (2) and with a means of selection for selecting measurements from measurements made by said angle-of-attack probes (2), wherein only the consistency of said selected measurements is verified.

10. A device for implementing the process specified under claim 1 wherein it includes:

- a first computing means (3) for computing said first coefficient of lift;
- a second computing means (5) for computing said second coefficient of lift; and
- a central unit (6) for verifying the consistency of the measurements of the angle-of-attack probe (2), on the basis of the computations made by said first and second computing means (3, 5).

* * * * *